Sept. 4, 1928.
J. G. RUCKELSHAUS
1,683,263
DISPLAY DEVICE
Filed April 20, 1927
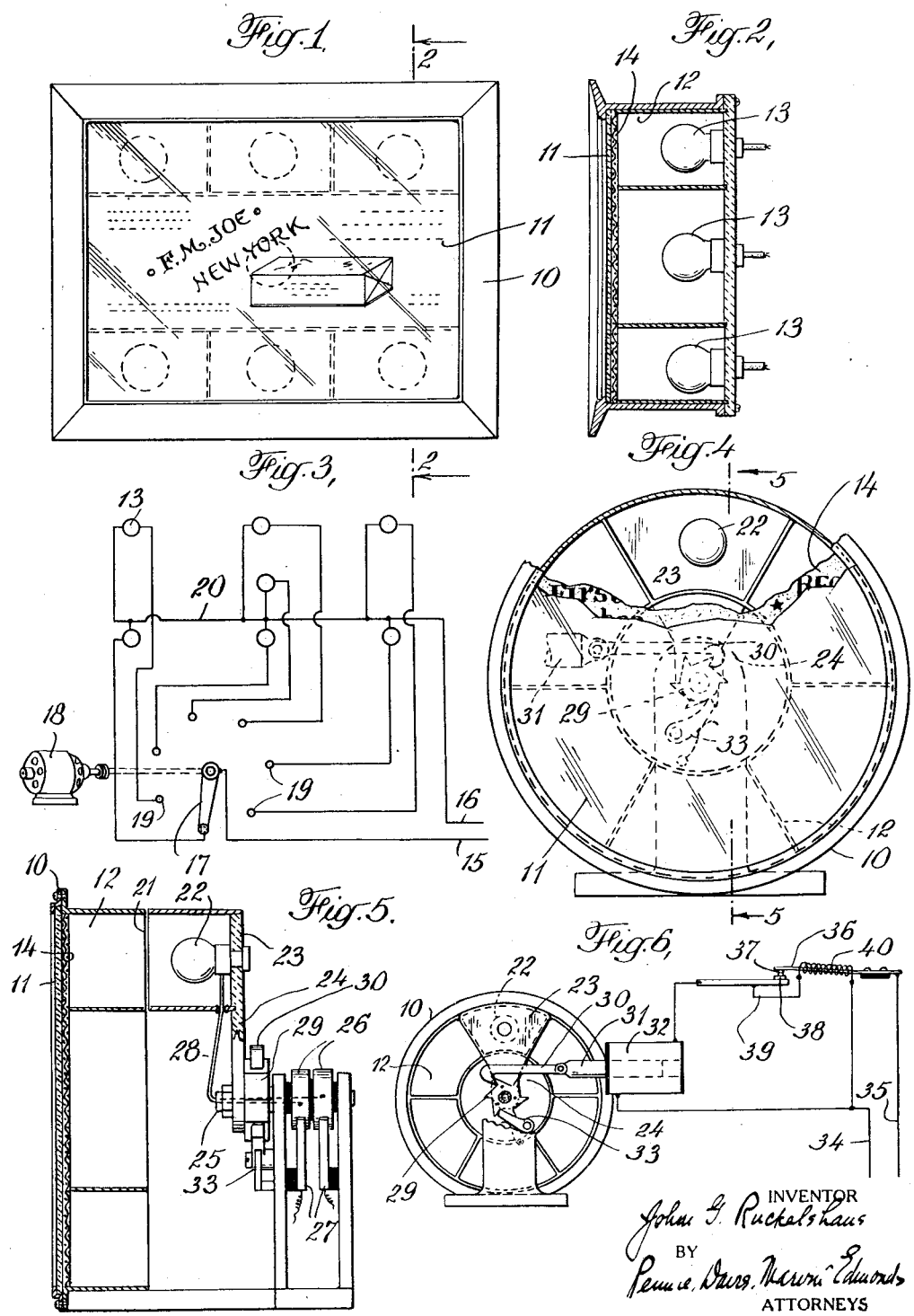

Patented Sept. 4, 1928.

1,683,263

UNITED STATES PATENT OFFICE.

JOHN GREER RUCKELSHAUS, OF NEWARK, NEW JERSEY, ASSIGNOR, BY MESNE ASSIGNMENTS, TO FANTUM MIRROR, INC., OF NEW YORK, N. Y., A CORPORATION OF NEW JERSEY.

DISPLAY DEVICE.

Application filed April 20, 1927. Serial No. 185,103.

This invention relates to display devices used for advertising and other similar purposes, and is concerned more particularly with a device of this kind which may be placed in a window or in other convenient location to display a series of normally concealed advertising messages.

The object of the invention is to provide an advertising device of novel form and pleasing appearance which combines the attractive features of an intermittently illuminated or flashing sign and a mirror, and this device includes a screen of special construction which forms the main surface or field thereof. This screen, when in front of a dark background, reflects light rays, but when illuminated from behind, transmits light without substantial decrease in intensity, so that under different conditions it serves either as a mirror or a window. Placed behind the screen are translucent advertising sheets which may be illuminated from behind in a selected order by suitable lamps. When the lamps are dark, the sheets and lamps are wholly concealed from view and the screen attracts the attention of passers-by who may wish to use a mirror. At intervals, the lamps are lighted, thus rendering the sheets visible through the screen, and the sudden and unexpected appearance of these advertisments at different points on the surface which is apparently only an ordinary mirror arouses wide curiosity and interest. The device is consequently highly effective, due to this element of surprise.

A further element of utility of this invention resides in the fact that when one of the lamps is lighted, in addition to attracting the attention of the passerby, the light transmitted therefrom serves to illuminate the face of the person whose attention is attracted so that the image of such person is reflected by that part of the device which remains a mirror, thereby enabling them to use the mirror even though there is no source of light other than that emitted from the sign.

For a better understanding of the invention, reference will be made to the accompanying drawings, showing different forms of devices which embody the invention. In these drawings Fig. 1 is a view in front elevation of one form of embodiment of the invention, Fig. 2 is a sectional view on the line 2—2 of Fig. 1, Fig. 3 is a diagrammatic wiring layout for the device illustrated in Fig. 1, Fig. 4 is a view in front elevation with parts broken away of a different form of the invention, Fig. 5 is a sectional view on the line 5—5 of Fig. 4, and Fig. 6 is a view in rear elevation showing the operating mechanism for the device illustrated in Figs. 4 and 5 and also showing the wiring therefor.

Referring now to the drawings, the device as illustrated in Fig. 1 includes a frame 10 which may be of any convenient material and of any desired shape and size. Mounted in this frame is a mirror screen 11 which is preferably a pane of glass having a thin layer of silver or other reflecting material on one face. This reflecting layer is relatively thin and will transmit strong light rays. When the screen is placed in front of a darkened area, however, it has the reflecting qualities of a mirror and may be used for that purpose.

Disposed behind the frame and mounted thereon in any convenient manner are compartments 12 defined by suitable light-proof walls and provided with illuminating devices 13 here illustrated as electric lamps. Each compartment is provided with one or more of these lamps, depending on the size of the compartment and the forward end of each compartment is closed by a translucent sheet 14 which carries an advertisement. These advertising areas may be arranged in any suitable or desired manner behind the reflecting screen 11 and when the lamps are darkened, the compartments and their advertisements are entirely concealed.

In the form of the invention illustrated in Fig. 1, there are seven such compartments arranged in upper and lower rows of three and separated by a central compartment which extends the entire length of the frame. Any other suitable or convenient manner of subdividing the area of the screen for advertising purposes may be employed, although it is preferable from the standpoint of effectiveness for advertising purposes to employ a number of such compartments which may be independently illuminated. For this purpose the lamps of the different compartments are supplied with current from main lines 15 and 16, the line 15 leading to a switch arm 17 which may be rotated in any convenient manner, as for instance by an electric motor 18 driving the arm through suitable gearing. The arm in its rotation comes into contact with contact points 19, each of which is connected to one of the lamps 13 and each lamp is connected to a return wire 20 connected in turn to the main line 16.

With the arrangement described, the rotation of the motor causes the lamps to be successively illuminated or flashed, and as each lamp is thus supplied with current, it lights up the translucent advertising area in front of it and that area is then visible through the mirror which now transmits light rays. The switch and its operating means may be arranged to light the lamps in any selected sequence and to maintain the lamps lighted through any selected interval. Preferably the intervals between the flashing of the lamps are sufficient to permit the screen 11 to be used as a mirror so that its utility in that respect attracts the attention of passers-by. While they are using the mirror the lamps are successively lighted and the advertising messages made visible, but when the lamps are darkened, these advertising areas are concealed and wholly invisible.

Instead of controlling the supply of current to the several lamps by a motor driving a rotating switch arm, the motor may be replaced by an electromagnet or solenoid which is energized from time to time and at each energization advances the arm by one step. If desired, the motor or solenoid may be used to move a single lamp to a position in which this lamp illuminates the advertising areas successively and such a mechanism is illustrated in Figs. 4, 5, and 6.

In this form of the invention, a screen 11 is employed which acts both as a reflector and a transmitter and this screen is mounted in a suitable frame 10. To the rear of the screen are mounted compartments 12 each having an open rear end 21. Each compartment is provided at its front end with an advertising sheet 14 placed directly behind the screen and these sheets may be illuminated so as to be visible through the mirror by means of a lamp 22. This lamp is mounted in a box 23 carried on the end of an arm 24 secured in any appropriate manner on a shaft 25, the shaft carrying contact rings 26 supplied with current through brushes 27, the rings being connected to the lamp by means of a conductor cable 28. The shaft is provided with a ratchet wheel 29 which is engageable by a pawl 30 pivotally mounted on the end of a core 31 of a solenoid 32. This core is held normally in the position illustrated in Fig. 6 by a spring (not shown) and when the solenoid is energized, the core is drawn into it, advancing the shaft by one tooth on the ratchet wheel. When the current supplied to the solenoid is cut off, the core is forced outwardly by its spring so that the pawl rides over another tooth on the ratchet wheel ready for the next movement. The return movement of the ratchet wheel is prevented by a spring-pressed dog 33.

Current is supplied to the solenoid 32 from supply lines 34 and 35 and the current supply is interrupted at intervals in any convenient manner, as for instance by a thermostatic switch. This switch as illustrated includes a thermostatic strip 36 carrying a contact point 37 at one end which contacts with another point 38 when the thermostatic strip is cool. The engagement of the contact points establishes a circuit by which current is supplied to the solenoid, and the strip is warmed by current flowing through a shunt line 39 including a coil 40 wound about the strip. The flow of current through the thermostatic switch permits current to flow through the heating coil 40 and as the strip is warmed it warps in the usual manner to separate the points 37 and 38. The solenoid is now deenergized, the core forced outwardly by its spring, and the pawl rides over a tooth on the ratchet wheel and into engagement therewith. The cooling of the strip causes the solenoid to be energized again and the shaft 25 is thus given a step-by-step rotation with intervals of a length determined by the type of thermostatic strip used.

The ratchet wheel 29 has as many teeth as there are compartments 12 disposed behind the mirror surface, and the ratchet wheel is arranged so that at each advance of one tooth, the box 23 is moved into registry with a compartment 12 in the series. The box 23 has a shape and size corresponding closely to the shape of the compartments and as the device is operated the lamp 22 is moved to illuminate the advertising areas 14 behind the screen, one after another, with only one area illuminated at a time.

It will be seen that the novel display device which I have intended is simple and compact and of ornamental appearance. As this device includes a mirror surface it attracts the attention of passers-by who may find use for a mirror, and while they are using the mirror the advertisements normally concealed from view are successively made visible. The device is thus highly effective for advertising purposes as it includes the attractive features of a mirror and of a flashing sign, but is more effective than the ordinary flashing sign since it is not apparent that the device is for that purpose and the appearance in the mirror frame of the illuminated advertisements in irregular sequence introduces an element of surprise which attracts much attention.

I claim:

1. A display device comprising the combination of a reflecting screen, a plurality of advertisement areas behind the screen and normally concealed thereby, the screen being capable of transmitting light rays when powerfully illuminated from the rear, and means behind the areas for separately illuminating them to render them visible through the screen.

2. A display device comprising the combination of a reflecting screen capable of transmitting light rays therethrough, a plurality of advertisement areas behind the screen and normally concealed thereby when the areas are darkened, means for separately illuminating the areas from the rear to render these areas visible through the screen, and means for operating the illuminating means in a selected order.

3. A display device comprising the combination of a frame, a reflecting screen mounted in the frame, this screen being capable of transmitting light rays therethrough, a plurality of advertisement areas disposed behind the screen, and means behind each area for illuminating and rendering it visible through the screen independently of the other areas.

4. A display device comprising the combination of a frame, a reflecting screen mounted in the frame and capable of transmitting light rays therethrough, a plurality of advertisement areas disposed behind the screen and normally concealed thereby, means behind each area for illuminating that area without illuminating other areas of the group, and means for operating the several illuminating means in a selected order.

5. A display device comprising the combination of a frame, a reflecting screen mounted in the frame and capable of transmitting light rays therethrough, a plurality of compartments disposed behind the screen and defined by light-proof side walls, each compartment having an advertising sheet at the end adjacent the screen, means for illuminating the compartments by light rays passing through the sheets and the screen and thus rendering the sheets visible from in front of the screen, and control means for operating the illuminating means in a selected order.

6. A display device comprising the combination of a frame provided with a plurality of compartments at one side thereof, a screen mounted in the frame to close one end of the compartments, this screen normally reflecting light rays but being capable of transmitting powerful rays therethrough, an advertising sheet mounted in each compartment adjacent the screen, a lamp in each compartment for illuminating the sheet therein and rendering this sheet visible through the screen, and means for supplying current to the lamps in a selected order.

7. A display device comprising the combination of a reflecting screen capable of transmitting light rays therethrough, a plurality of sheets placed behind the screen and carrying advertisements, a plurality of compartments, each having side walls extending along the boundaries of a sheet, and means for projecting light rays into the compartments for rendering the advertising sheets therein successively visible, the said means being capable of selective control.

8. A display device comprising the combination of a screen normally having the appearance of a reflector, but capable of transmitting light rays therethrough, a plurality of translucent advertising sheets behind the screen and normally concealed thereby, a plurality of compartments mounted behind the screen, each sheet forming the front wall of one of the compartments and the other walls thereof being light-proof, a lamp in each compartment capable of illuminating the sheet therein and rendering this sheet visible through the screen, means for supplying current to the lamps, and control means for controlling the current supply to cause the lamps to be illuminated in a selected order.

In testimony whereof I affix my signature.

JOHN GREER RUCKELSHAUS.